UNITED STATES PATENT OFFICE.

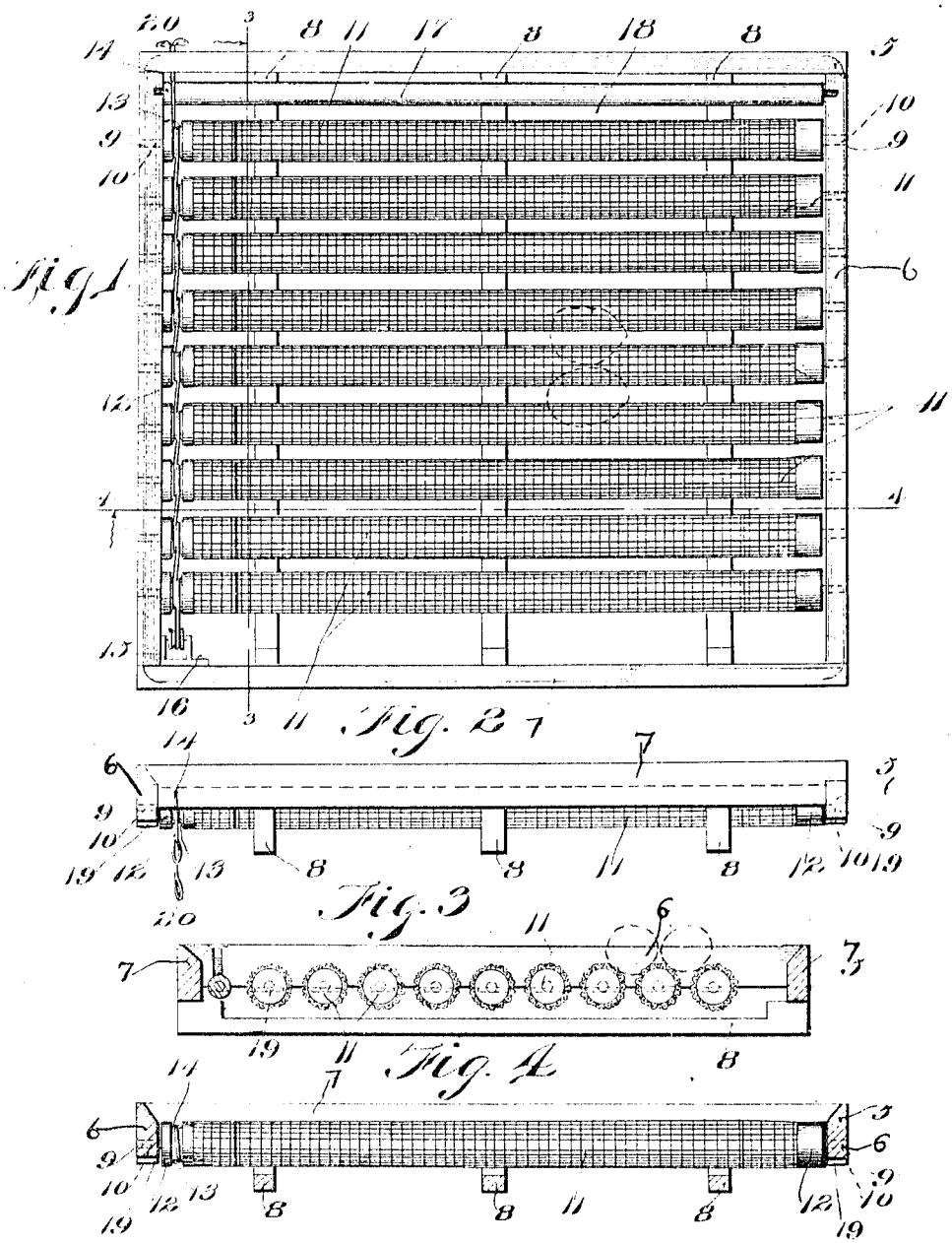

THEODORE HINES, OF PUEBLO, COLORADO.

INCUBATOR EGG-TRAY.

1,035,791.  Specification of Letters Patent.  Patented Aug. 13, 1912.

Application filed February 7, 1911. Serial No. 607,102.

*To all whom it may concern:*

Be it known that I, THEODORE HINES, a citizen of the United States, residing at Pueblo, in the county of Pueblo and State of Colorado, have invented new and useful Improvements in Incubator Egg-Trays, of which the following is a specification.

The invention relates to trays, and more particularly to the class of egg-turning incubator trays.

The primary object of the invention is the provision of a tray of this character in which eggs to be hatched may be supported, and all of which may be simultaneously turned in a single operation, thereby avoiding the handling of individual eggs for this purpose.

Another object of the invention is the provision of a tray of this character in which chicks hatched from the eggs supported by the tray may gain access to the warming chamber or compartment of an incubator, thus obviating the handling of such chicks by hand which would necessarily result in injury to the same.

A further object of the invention is the provision of a tray of this character which may be readily and easily fitted in and removed from incubators of ordinary well-known construction, and that is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.
In the drawings: Figure 1 is a top plan view of a tray constructed in accordance with the invention. Fig. 2 is a side elevation thereof. Fig. 3 is a vertical sectional view on the line 3—3 of Fig. 1. Fig. 4 is a transverse sectional view on the line 4—4 of Fig. 1.

Similar reference characters indicate corresponding parts throughout the several views of the drawings.
Referring to the drawings by numerals, the tray comprises a rectangular-shaped frame 5, the same including spaced vertical side beams 6 and transverse end beams 7, which are united in any suitable manner, and mortised in the under faces of the said end beams 7 are spaced longitudinally arranged supporting beams 8 which are adapted to rest upon the flooring of a warming chamber in an incubator and thereby support the frame 5 elevated from such flooring of the warming chamber. The side walls 6 of the frame 5 at their upper edges are provided with spaced alining bearing notches 9 in which are journaled the stud spindles 10 projecting from opposite ends of rotatable egg turning rollers or cylinders, as will be hereinafter more fully described. These egg turning rollers or cylinders comprise wire woven cylindrical bodies 11, each being closed at opposite ends by circular shaped heads 12, in which are centrally fixed the stud spindles 10, the cylindrical bodies 11 being arranged in spaced parallel relation to each other between the side beams 6 of the frame, and upon contiguous rollers are supported the eggs to be hatched in an incubator.

Fixed to the spindles 10 at one end of the rollers or cylindrical bodies 11 are grooved alining pulleys 13, over which is reversely wound an operating cable or cord 14, the same being trained over a guide pulley 15 journaled in a bearing or bracket 16 fixed to one end wall 7, and also over a guide roller 17 journaled in the side walls 6 of the frame, contiguous the other end wall 7, the journal ends of the guide roller 17 being removably fitted in suitable bearing notches formed in the said side walls of the frame, whereby the roller 17 may be readily removed for affording a space 18 between the adjacent turning roller or cylinder 11 and the said end wall 7, so that when the eggs have been hatched, the chicks therefrom may drop through this space 18 onto the flooring of the warming chamber in the incubator.

Secured to the top edges of the side walls 6 of the frame 5 and overlying the bearing notches 9 therein are retaining strips 19, which prevent the stud spindles 9 of the turning rollers from jumping out of the bearing notches 9 when being turned by the cable 14, the latter being provided with loop ends 20 which enable the cord or cable 14 to be pulled upon at either end thereof for the reverse turning or rotation of the egg supporting rollers or cylindrical bodies 11 in the frame. By reason of the formation of the wire mesh cylindrical bodies 11, air circulation in the warming chamber is unobstructed and such warm air is permitted to pass through the said cylindrical bodies to the bottom of the egg tray, and keep the same temperature below the eggs as above.

It is evident that on the turning of the egg supporting rollers or cylindrical bodies 11, the eggs thereon may all be simultaneously turned, without requiring an attendant to handle the eggs singly for this purpose. Also by affording the space 18 in the frame 5, after the guide roller 17 has been removed from the frame, it enables the chicks to gain access to the flooring of the warming chamber in the incubator, without necessitating an attendant handling the chicks so as to remove the same from the tray and placing them on such flooring of the warming chamber.

What is claimed is:

An incubator tray, comprising a frame having beveled upper edges, spaced longitudinally arranged supporting beams mortised in the under faces of the end beams of the frame, the said frame being provided with vertical slots in its side walls adjacent to its front wall, a roller having trunnion ends detachably engaged in said slots, a plurality of foraminous cylindrical rollers rotatably journaled in the side walls of the frame and arranged in spaced parallel relation to each other, grooved pulleys fixed to one end of the rollers in alinement with each other, a bracket fixed to the inner face of the rear wall of said frame in alinement with said pulleys, a guide pulley journaled in said bracket, and a flexible cable trained over said guide pulley and also reversely trained over said grooved pulleys, the said front wall of the frame being provided with an aperture in alinement with the grooved pulleys and receiving the free ends of said cable, whereby the free ends of said cable will project exteriorly of the frame at the front thereof.

In testimony whereof I affix my signature in presence of two witnesses.

THEODORE HINES.

Witnesses:
T. J. WHITLOW,
JAS. F. FLOYD.